United States Patent

[11] 3,586,779

[72] Inventors M. Philip Chernack
399 June Place, West Hempstead, N.Y. 11552;
Arthur L. Zimmet, 203 East 76th St., New York, N.Y. 10021

[21] Appl. No. 789,674
[22] Filed Jan. 8, 1969
[45] Patented June 22, 1971

[54] TELEPHONE ANSWERING DEVICE WITH SOLENOID COUPLER
12 Claims, 10 Drawing Figs.

[52] U.S. Cl. .......... 179/6, 179/1
[51] Int. Cl. .......... H04m 1/64
[50] Field of Search .......... 179/6 AC, 1 C, 2 C

[56] References Cited

UNITED STATES PATENTS

| | | | |
|---|---|---|---|
| 2,658,107 | 11/1953 | Zimmermann | 179/6 |
| 3,127,474 | 3/1964 | Waldman | 179/6 |
| 3,217,110 | 11/1965 | Huntington | 179/1 |
| 3,319,003 | 5/1967 | Prager | 179/1 |
| 3,376,390 | 4/1968 | Hashimoto | 179/6 |
| 3,445,600 | 5/1969 | Todd | 179/6 |
| 3,466,396 | 9/1969 | Guimond | 179/6 |
| 3,471,643 | 10/1969 | Owen | 179/1 |

*Primary Examiner*—Bernard Konick
*Assistant Examiner*—Raymond F. Cardillo, Jr.
*Attorney*—Sparrow and Sparrow ABSTRACT: A telephone-answering device with recording and playback features. The device is placed on a standard telephone receiving and transmitting apparatus, and is electrically independent of the telephone circuit. When actuated by a ringing signal, the device transmits a prerecorded message to the caller. Afterward, the device will record any spoken message from the calling party in response to the prerecorded message. The recorded messages from the calling party may be played back, at will, at the telephone-receiving apparatus.

INVENTORS.
M. PHILIP CHERNACK
ARTHUR L. ZIMMET
BY
SPARROW AND SPARROW
ATTORNEYS

INVENTORS.
M. PHILIP CHERNACK
ARTHUR L. ZIMMET

BY SPARROW AND SPARROW
ATTORNEYS

INVENTORS.
M. PHILIP CHERNACK
ARTHUR L. ZIMMET

BY SPARROW AND SPARROW

ATTORNEYS

INVENTORS.
M. PHILIP CHERNACK
ARTHUR L. ZIMMET

BY SPARROW AND SPARROW
ATTORNEYS

INVENTORS
M. PHILIP CHERNACK
ARTHUR L. ZIMMET
BY SPARROW AND SPARROW
ATTORNEY

TELEPHONE ANSWERING DEVICE WITH SOLENOID COUPLER

BACKGROUND OF THE INVENTION

A telephone-answering device is useful for responding to a calling person when no one is present to pick up the receiver of the telephone apparatus being called. It is of particular advantage to the persons involved, furthermore, when the telephone-answering device is capable of recording a message transmitted by the calling party in response to a prerecorded message heard by the calling party upon ringing the telephone apparatus associated with the answering device. Heretofore, such answering devices known in the art, have been bulky, complex in installation, difficult to operate, and costly to produce in manufacture. This invention overcomes disadvantages of prior art devices by providing a telephone answering device which is a relatively small unit and which may be simply placed on an existing telephone receiving and transmitting apparatus, without requiring any skill for installation; and which is fully independent in its electrical circuit from the conventional telephone circuit over which conversations take place.

Objects and advantages of the invention will be set forth in part hereafter and in part will be obvious herefrom or may be learned by practicing the invention, the same being realized and attained by means of the instrumentalities and combinations pointed out in the appended claims.

SUMMARY OF THE INVENTION

The present invention is a relatively small unit which may be produced economically and which does not affect adversely the appearance of the telephone receiving and transmitting apparatus to which the answering device is applied.

The invention is a device for answering a telephone, in response to a ringing signal, when no person is available in the immediate vicinity to pick up the receiver of the apparatus being called. The ringing signal is picked up by an electromagnetic coil within the device, and circuitry is actuated which causes a prerecorded message to be transmitted to the calling party or the person placing a call. After the prerecorded message has thus been transmitted, the device is in readiness to accept and record a response message spoken by the calling person. This response message may then by played back and heard by the user of the device, whenever desired. A novel electromechanical actuating arrangement permits the telephone-answering device to be packaged within a relatively small amount of space, and thereby provide a unit which is attractive in appearance, and is economical to manufacture.

The prerecorded message is contained on one reel of magnetic tape which also includes actuating signals for establishing, in part, the sequence of operation of the electronic controlling circuitry. The response message from the calling person is recorded on a second reel of magnetic tape. A single capstan drives both reel at substantially uniform velocity of the tapes.

It is an object of the present invention to provide a telephone-answering device which may be simply placed on an existing telephone receiving and transmitting apparatus, without requiring any skill for installation.

It is a further object of the present invention to provide a telephone-answering device which is fully independent in its electrical circuit from the conventional telephone circuit over which conversations take place.

Another object of the present invention is to provide a relatively small unit which may be produced economically and which does not affect adversely the appearance of the telephone receiving and transmitting apparatus to which the answering device is applied.

Various further and more specific purposes, features and advantages will clearly appear from the detailed description given below taken in connection with the accompanying drawing which forms part of this specification and illustrates merely by way of example one embodiment of the device of the invention. Brief Description of the Drawings In the following description and in the claims, parts will be identified by specific names for convenience, but such names are intended to be as generic in their application to similar parts as the art will permit. Like reference characters denote like parts in the several figures of the drawing, in which FIG. 1 is an isometric view of the device of the present invention when installed on a conventional telephone-receiving and transmitting apparatus;

Description of the Preferred Embodiments

Figure 1:
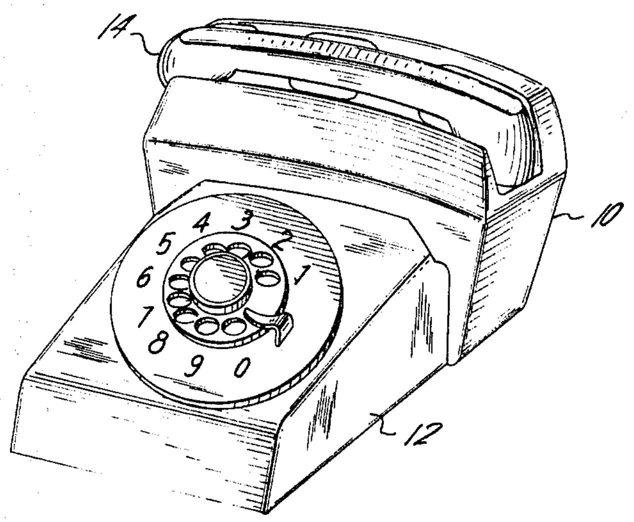

Referring to the drawing, the device 10 of the present invention is placed over the telephone instrument 12, and forms the support for the handset 14. When installing the device, the handset is first lifted from the instrument, the device 10 is placed over the instrument 12, and the handset 14 is replaced upon the cradle-shaped portion of the device 10.

Figure 2:
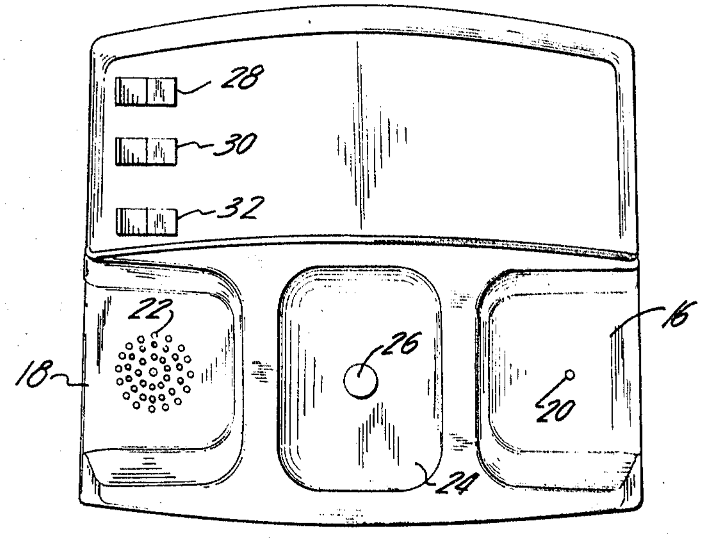
FIG. 2 is a top view of the device of the present invention in FIG. 1.
Figure 3:
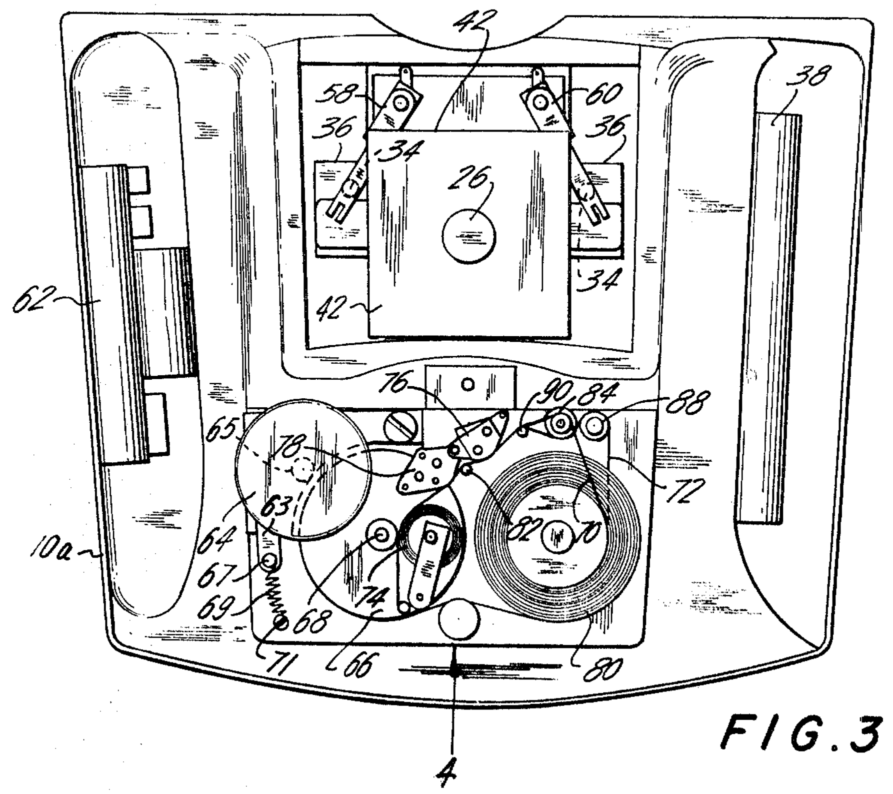
FIG. 3 is a top view of the interior of the device of the present invention, with the upper portion of the enclosure shown in FIG. 2 removed.

The cradle portion of the device 10 which accommodates the handset 14, is shown in detail in FIG. 2. The recesses 16 and 18 form the seatings for the receiver and speaker portions of the handset 14. The receiver-associated portion 16 includes an opening 20 beneath which a microphone is mounted. The microphone picks up any audible sounds emitted through the receiver of the handset. The speaker-associated recess 18 includes a number of openings 22 for transmitting the sounds of a loudspeaker mounted beneath these openings. The loudspeaker is used to transmit the prerecorded message to the speaker portion of the handset 14, by way of the opening 22. The microphone 20, on the other hand, senses or picks up the response message transmitted from the calling person through the receiving portion of the handset 14. The central recess 24 has an opening through which a button 26 projects and contacts the handset, when in place on the cradle portion.

When the handset 14 is resting on the device 10 as shown in FIG. 1, the button 26 is depressed by the handset and thereby depresses simultaneously the two buttons on the instrument which are normally held down by the handset when the instrument is not in use. Thus, when the device 10 is applied as shown in FIG. 1, the handset 14 will maintain the two buttons on the instrument depressed to indicate that the instrument is not in use, and is prepared to receive a call through a ringing signal. At the same time, the device 10 is entirely electrically isolated from the electrical circuitry of the telephone instrument 12 and the handset 14. No modifications, whatsoever, are furthermore, required in applying the device 10 to the telephone apparatus.

The device 10 includes switches 28, 30 and 32 for the purpose of controlling the operating modes of the device. Switch 28 is, for example, the playback-record switch, whereas the actuation of switch 30 turns on power and resets the instrument. Switch 32 may be used for switching the device off. In the off-position of switch 32, the device 10 is entirely inactive and the telephone apparatus may be used in the conventional manner, even though the device 10 is interposed between the instrument 12 and the handset 14.

Thus, when switch 32 has been actuated to its off-position, and a ringing signal is heard from the instrument 12, the handset 14 may be lifted and a conversation may be conducted in the customary manner. When the switch 30 has been actuated to the on-position and a ringing signal is transmitted to the instrument 12, the two instrument buttons are permitted to move upward towards the handset 14, without lifting or applying any motion to the latter. It is apparent, therefore, from this description of the device 10, that the telephone apparatus is operated in the conventional manner without interference or the application of any modifications to the telephone apparatus by the device 10.

Before a ringing signal is transmitted to the telephone apparatus for the purpose of receiving and transmitting conversations, the two buttons 34 on the instrument 12 are maintained depressed through an actuator plate 36. With these two buttons, present on the conventional telephone apparatus, depressed in this manner, the apparatus is in readiness to receive a ringing signal. When such a ringing signal arrives, it is detected by a pickup coil 38 mounted within the device 10 so that it lies in immediate proximity of the electromagnetic coil within the instrument 12 for actuating the bell therein. Thus, the pickup coil 38 is magnetically linked with the coil of the bell within the instrument 12. At the same time, there is no physical connection between the pickup coil 38 and the coil within the instrument 12.

After suitable amplification, in a manner to be described, the ringing signal is applied to a solenoid 40 mounted on a bracket 42. When the solenoid 40 becomes energized, it attracts in an upward direction the armature plate 36, and thereby permits the buttons 34 to become released and project upwards, in preparation to receiving and transmitting telephone conversations.

Figures 5, 6:
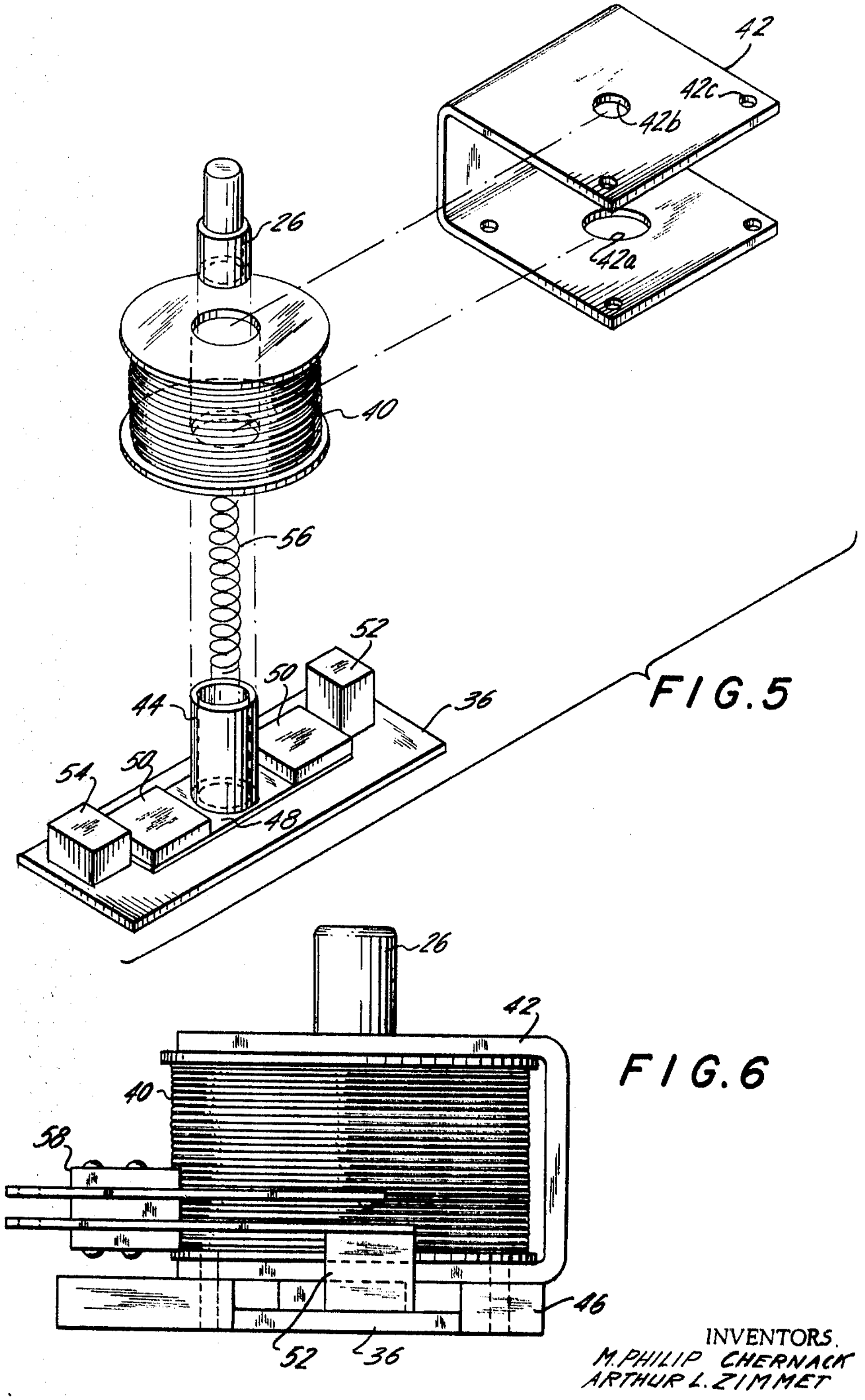
FIG. 5 is an isometric view showing the parts of the solenoid actuator outlined in FIG. 3, and the interrelationship of the parts prior ro complete assembly.
FIG. 6 is a side view of the solenoid actuator of FIG. 5 when assembled.
Figure 7:
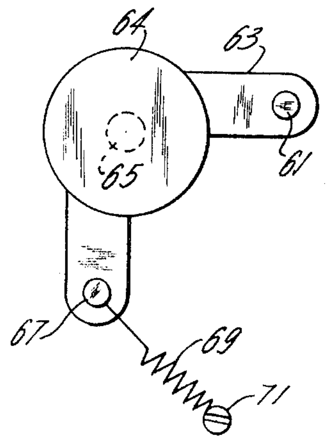
FIG. 7 is a top view of the motor-mounting arrangement used to drive the magnetic tape in the present invention.

The constructional details of the solenoid assembly are shown in FIGS. 5 and 7. The solenoid coil of wire 40 slips over a hollow cylindrical core 44. The coil wire 40 is held within a bracket 42 which is U-shaped. The bracket is secured to the housing or enclosure of the device 10 by means of the mounting 46. The cylindrical core 44 is fastened to the armature plate 36. Limit stops and cushions 50 are also mounted upon the armature plate 36, so as to abut against the coil 40 when the armature is attracted through energization of the coil. Switch-actuating blocks 52 and 54, fastened to the armature plate 36, actuate switches when the armature moves upward upon the receipt of a ringing signal.

Within the interior of the hollow cylindrical core 44, is a spring 56 supporting the button 26. When the button 26 is depressed by the weight of the hand set 14 placed upon the device 10, spring 56 becomes compressed, and thereby applies a force to the armature plate 36, tending to move the plate 36 away from the coil 40. When the latter becomes energized as a result of the ringing signal sensed by the pickup coil 38, the force attracting the armature plate, through the magnetic field, is sufficient to overcome the spring force, and the armature plate moves upward. As a result of the hollow core construction of the present invention, it is possible to mount the entire solenoid assembly within a very small amount of space in the device 10, and thereby maintain the latter in compact form. Thus, the spring 56 and button 26 both fit within the interior of the hollow core 44 surrounded by the coil 40. A small portion of the button 26 only, projects from the top of the bracket 42, to permit actuation by the handset 14.

Once the coil 40 is energized and the armature plate 36 becomes attracted in the upward direction, switches 58 and 60 become actuated through the switch actuator blocks 52 and 54, respectively. With the actuation of these switches, electrical signals are transmitted to the electronic circuit board 62 which commences to establish a sequence operation of the device 10, whereby the functions of the device are carried out. The coil 40 is held within the interior of the bracket 42, and therefore the lower opening 42*a* corresponds to the external diameter of the cylindrical core 44, whereas the opening 42*b* corresponds to the outer diameter of the button 26. The holes or openings 42*c* on the bracket are provided for mounting the latter in place within the enclosure of the device 10.

When a ringing signal causes the solenoid coil 40 to become energized, a motor 64 becomes energized simultaneously and commences to turn. .The motor 64 rotates a flywheel for the purpose of smoothing out any irregularities in the speed of the motor, and providing a source of constant rotational speed. The flywheel 66 has a frictional rim surface which bears against a mating frictional surface mounted upon the shaft on the motor 64.

Integrally constructed with the flywheel 66, is a capstan 68. Magnetic tapes 70 and 72 are driven by the capstan 68, by bearing against friction rollers 74. Along the path of motion of the magnetic tape, are an erase head 76 and a read and record head 78. The erase head 76 functions to erase all information that may be present on the tapes, whereas the read and record head serves to either apply or record information onto the magnetic tapes, or read information on the tapes, depending on what mode of operation is desired. With substantially constant rotational speed of the capstan 68, the linear motion of the magnetic tapes 70 and 72 are also carried out at constant velocity, and therefore speech is either recorded or played back faithfully.

The magnetic tape 70 has a relatively long loop and is designated to record messages from the calling person. The magnetic tape 70 is mounted upon a reel 80 which unwinds from the internal diameter and rewinds on the external diameter of the wound tape. Thus, the magnetic tape 70 is a continuous loop which rewinds at its outer surface at the same time that it unwinds at the inner surface of the reel. Guideposts 82 and 84 are provided to direct the magnetic tape along a predetermined path which assures that the tape is properly brought into contact with the erase head 76 and the read and record head 78.

The magnetic tape 72 is mounted upon a reel 86 directly beneath the reel 80. This reel unwinds, similarly, from the inside of the reel, and rewinds on the outside thereof. The magnetic tape 72 has a relatively short loop compared to that of magnetic tape 70, and contains the prerecorded message transmitted to the person calling. On its way to the read-head 78, the magnetic tape 72 passes over a contact post 88 which senses one of two switching contact segments applied to the tape 72. These contact segments are on opposite sides of the tape so that two independent timing and switching functions can be carried out. One contact segment switches the system from transmitting a prerecorded message to receiving and recording the message from the caller. The other contact segment switches the instrument off and resets it for the nest telephone call. When these contact segments on the tape pass the posts 88 and 84 they close circuits which emit controlling signals for the purpose of carrying out the operational sequence of the device in the proper manner. Post 88 is associated with one contact segment on one side of the tape, whereas post 84 is associated with the second contact on the opposite side of the tape. The post 90 cooperates with the post 84 to assure that the tape 72 is directly in contact with the post 88 so that the contact segments on the tape are detected at the proper instant.

Figure 4:
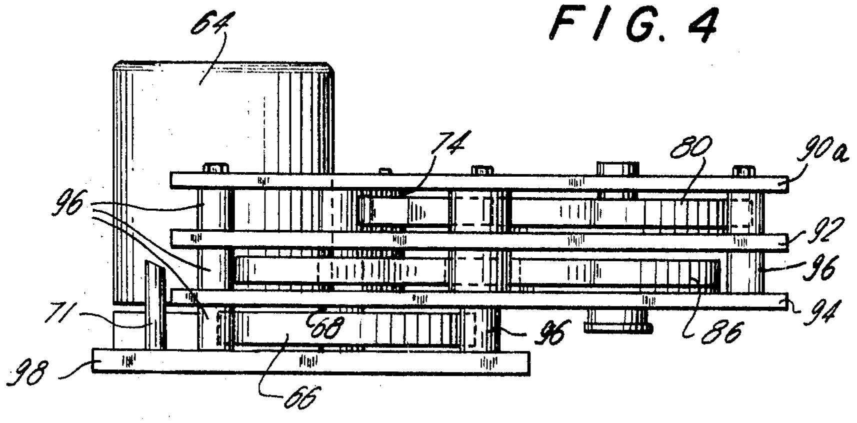
FIG. 4 is a side view of the interior shown in FIG. 3 shown in the direction of the arrow.

All of the operating components of the device 10 are mounted within an enclosure 10*a* which may be formed of a suitable material such as plastics. To mount the reels of magnetic tape in compact form, upper and lower deck construction is used as shown in FIG. 4. Mounting plates 90*a*, 92 and 94 are maintained separate from each other to form decks, by means of spacers 96 which are repeated at various locations to assure that the deck plates are held in place parallel to each other. A baseplate 98 supports the shaft for the flywheel 66, as well as the motor 64.

To retain the shaft 65 of the motor 64 in contact with the rim of the flywheel 66 and thereby produce continuous rotation of the flywheel, the motor is mounted upon an angular bracket 63 which is rotatable about the pivot 61. At the other end 67 of the angular bracket 63, a spring 69 is fastened. The other end of the spring 69 is anchored at the position 71 so as to establish a tensile force within the spring. Through the action of the spring 69, the motor shaft 65 is maintained firmly against the frictional rim of the flywheel 66. With this particular floating mounting of the motor, any wear in the rim of the flywheel 4 and the motor shaft in contact therewith, are immediately compensated and continuous rotation of the flywheel is maintained through the shaft rotation of the motor 64.

Figure 8:
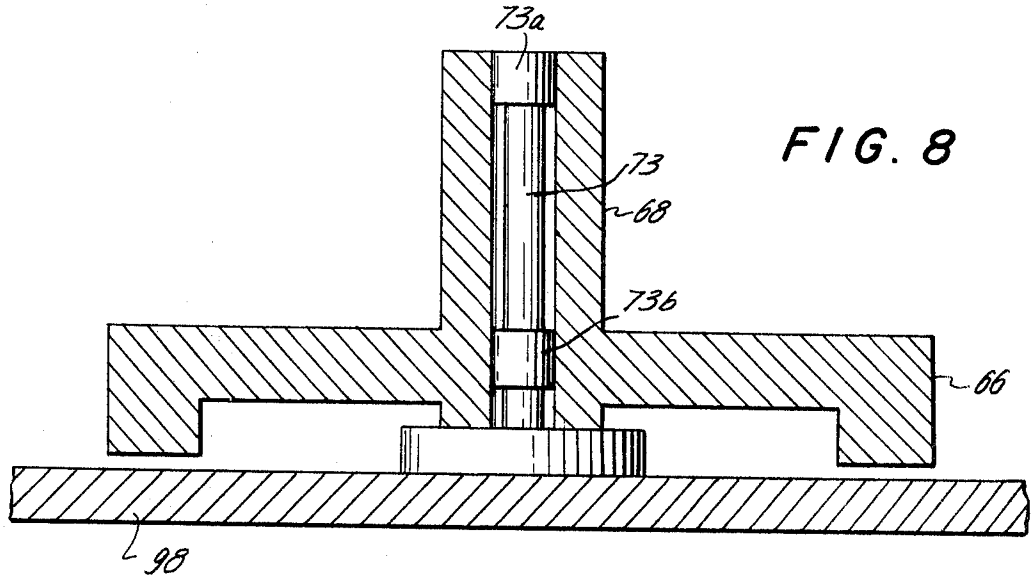
FIG. 8 is a sectional view of the flywheel and capstan driven by the motor of FIG. 7.
Figure 9:
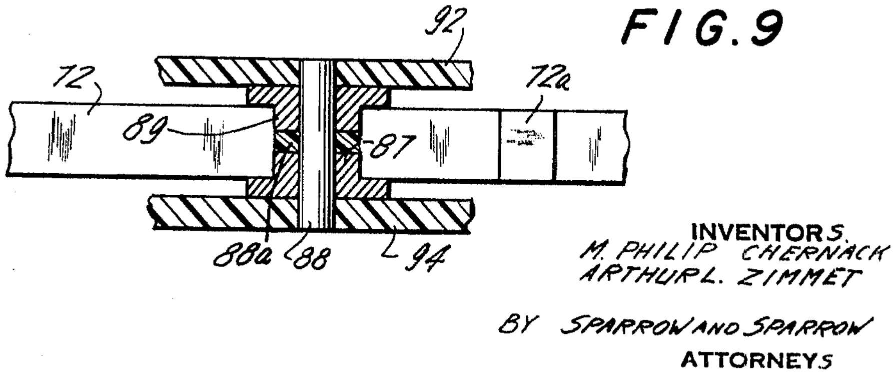
FIG. 9 is a partial sectional view and shows the switching arrangement for obtaining a circuit closure through a contact segment on the magnetic tape.
Figure 10:
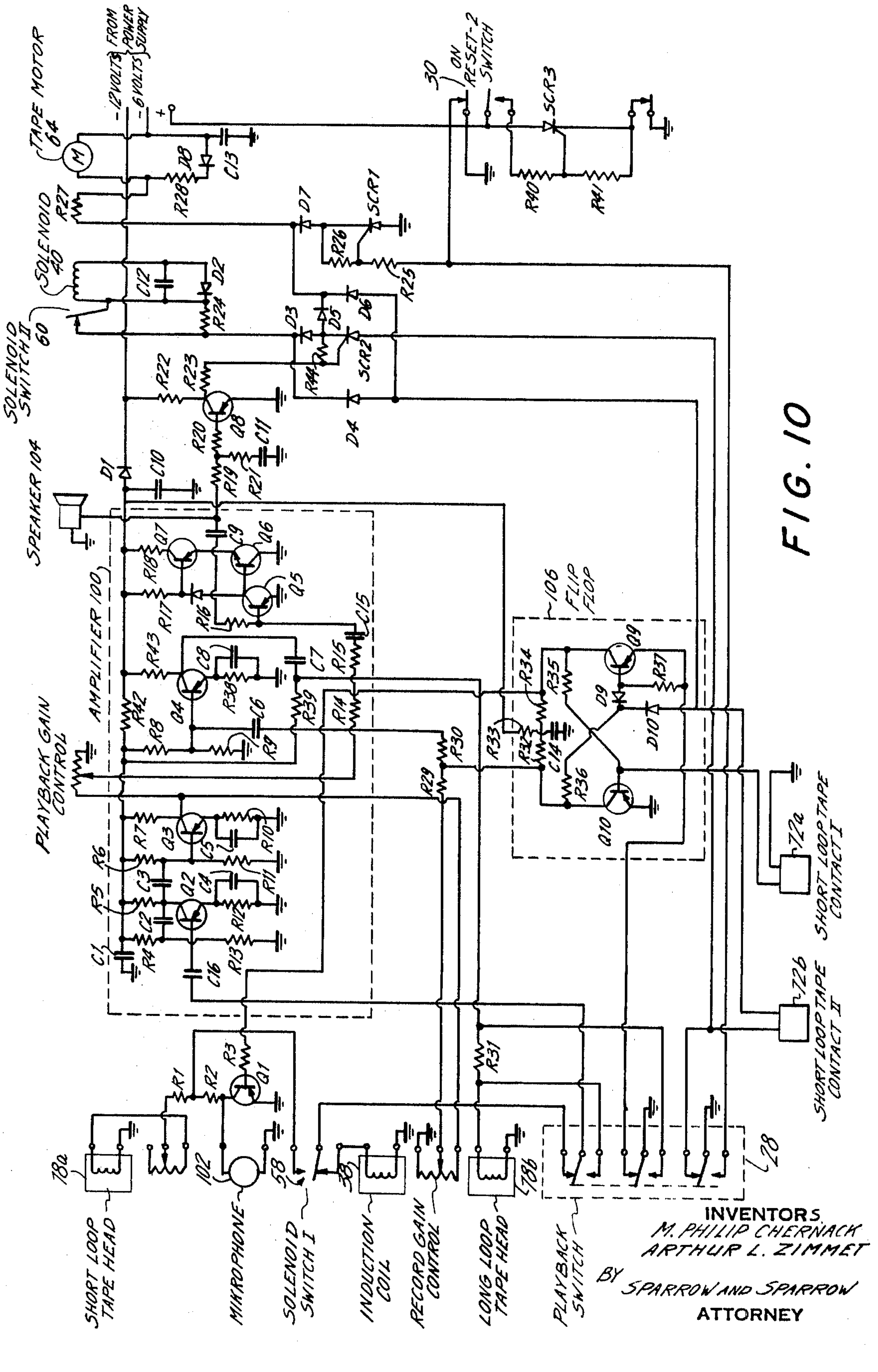
FIG. 10 is an electrical circuit diagram and shows the electrical components and their interconnections for carrying out the functional operation of the device in accordance with the present invention.

The flywheel 66 is integrally constructed with the capstan 68, as shown in FIG. 8. A cantilever shaft 73 secured to the base plate 98, serves as a bearing shaft support for the flywheel and capstan assembly. To reduce the frictional resistance between the stationary shaft 73 and the rotating capstan and flywheel assembly, the shaft 73 does not contact the assembly along the entire length of the shaft. Thus, the capstan and flywheel assembly contacts the shaft 73 only at the portions 73*a* and 73*b*, and receives thereby the necessary two-point support.

In operation, when a person wishes the telephone apparatus to be attended by the device 10, of the present invention, the momentary contact switch 30, designated as the "on" switch is actuated. The motor 64 thereupon is energized and rotates until a reference position is established as determined by a metal contact 72*a* on the tape 72. Thus, the tape 72 is partially wound about the post 88 on its path of motion. The post 88 is made of nonconducting material such as plastics, and is held in place through the mounting plates 92 and 94 which are, similarly, of nonconducting material or plastics. Secured to the post 88 are two metallic contacts 87 and 89 continuously wiping the tape 72 as the latter moves along the designated path. The two contacts 87 and 89 are normally separated from each other and electrically isolated by the insulator 88*a*. When a contact 72*a* on the tape 72 passes the contacts 87 and 89 mounted upon the post 88, the two contacts 87 and 89 become bridged or short-circuited through the tape contact 72*a*. As a result, the circuit is closed when the two contacts 87 and 89 are thus bridged, and this closed circuit signals that the desired reference position has been established, and the motor may cease to rotate.

When a ringing signal is emitted by the telephone instrument 12 as a result of the action of a calling party, the ringing signal is packed up by the induction coil 38 as previously described. The signal induced within the coil 38 is transmitted, by way of the playback switch 28, to the amplifier 100 for suitable amplification. The amplifier 100 is conventional transistorized amplifier which amplifies the applied signal through transistors Q2 to Q7, inclusively. The output of the amplifier 100 is applied, through transistor Q8 to the controlled rectifier SCR 2. This triggers the latter and causes the solenoid 40 to become energized through the switch 60. At the same time, the motor 64 also becomes energized and commences to rotate. Once the coil 40 has become energized and the armature plate 36 has become attracted upward, switch 60 is opened and current flows to the coil 40, by way of the resistor R24. With the armature plate 36 in the upward position, switch 58 also becomes opened at the same time. The current through resistor R24 is the holding current for the solenoid coil 40, and is made smaller than the actuating current through the switch 60. This circuitry takes advantage of the condition that the holding current for a solenoid coil is considerably smaller than the actuating current thereof, and thereby the solenoid coil is not required to dissipate as much heat, as would be necessary if the actuating current were applied to the coil throughout its operational state.

With the switch 58 changed in position, the prerecorded message on the tape 72 is read by the tape head 78*a* of the read and record head 78, and applied, by way of the switches 58 and 28 to the input of the amplifier 100. The prerecorded message is thereby amplified and applied to the speaker 104 beneath the openings 22 of the enclosure 10*a*. The message emitted by the speaker 104 is transmitted over the telephone lines to the calling party. When the prerecorded message has been fully transmitted, the contact 72*a* on the tape 72 produces a circuit closure which actuates the flip-flop 106 to the opposite state. This flip-flop is of conventional design with transistors Q9 and Q10. The actuation of the flip-flop 106, in this manner, grounds the speaker 104 and permits the microphone to be connected to the amplifier, by way of the transistor Q1. At the same time, the output of the amplifier is connected to the tape head 78*b* of the read and record head 78, for recording the message received by the microphone 102 mounted beneath the opening 20 in the enclosure of the device 10. After a predetermined time interval, sufficient to allow recording of the message from the calling party, contact segment 72*b* on the tape 72 passes the contact post 88. The circuit closure established by the contact segment 72*b*, grounds the controlled rectifier SCR2, and the latter is thereby turned off. At the same time, the circuit closure established through segment 72*b* actuates flip-flop 106 to the opposite state. As a result, the solenoid coil 40 and the motor 64 become deenergized, and the speaker 104 is reconnected into the circuit. With the coil 40 deenergized, switches 58 and 60 are returned to their initial positions since the armature plate 36 becomes released.

To set the device 10, of the present invention into the playback mode of operation for playing back the message recorded from the calling party, the playback switch 28 is actuated. As a result, the controlled rectifier SCR 1 is turned on and the motor becomes energized, while the coil 40 remains deenergized. At the same time, the tape head 78*b* is connected to the amplifier for reading the recorded message from the calling person on the tape 70. The speaker 104 is connected to the output of the amplifier to provide an audible signal of the recorded message. This recorded message is then played back and repeated until turned off through actuating again the playback switch 28.

To take the device 10, of the present invention, entirely out of service so that it does not perform any of its functions, the momentary contact switch 32 is actuated. As a result, controlled rectifier SCR3 is turned off and thereby disconnects the device 10 from the applied power supply. With no power supplied to the device, no functional operation can take place. The device 10 may be returned to its normal operating state by simply actuating the record switch 30 which turns the controlled rectifier SCR3 on again.

While the invention has been described and illustrated with respect to a certain preferred example, it will be understood by those skilled in the art after understanding the principle of the invention, that various changes and modifications may be made without departing from the spirit and scope of the invention.

We claim:

1. A telephone-answering device for use with a conventional telephone receiving and transmitting apparatus comprising, in combination, ringing signal sensing means for sensing a ringing signal applied to said telephone apparatus; electromagnetic actuating means energized from said sensing means and actuating said telephone apparatus to simulate removal of the handset from its cradle in said conventional telephone apparatus; message transmitting means actuated by said sensing means for transmitting a prerecorded message from said telephone apparatus; message receiving and recording means actuated by said message transmitting means for receiving and recording a message transmitted to said telephone apparatus after said prerecorded message has been transmitted from said telephone apparatus; resetting means actuated at the end of said message transmitted to said telephone apparatus for deenergizing said electromagnetic means and returning said device and said telephone apparatus to the initial state preparatory to performing a new cycle commencing with said ringing signal and ending with the recording of said message transmitted to said telephone apparatus, said electromagnetic actuating means comprising a solenoid coil producing a magnetic field when energized and having an opening directed along its longitudinal axis; hollow ferromagnetic core means slidable within said opening in said coil along said axis; armature means secured to one end of said core means; spring means within said core means and bearing against said armature means; and spring depressing means acting on said spring means and partially projecting from said core means, said core means being partially moved out of said opening in said coil when said spring depressing means is depressed against said spring means and said coil is deenergized.

2. The telephone-answering device as defined in claim 1 including amplifying means and switching means for connecting said amplifying means as desired to said sensing means, message transmitting means, and message receiving and recording means.

3. The telephone-answering device as defined in claim 1 wherein said ringing signal-sensing means comprises an electromagnetic coil in proximity to the conventional bell coil in said conventional telephone apparatus, said electromagnetic coil being magnetically linked with the magnetic field generated by said bell coil when a ringing signal is transmitted thereto.

4. The telephone answering device as defined in claim 1 wherein said message-transmitting means comprises magnetic tape means with a message prerecorded thereon, and switching contact segments on said tape said switching contact segments determining the timing of said cycle through spacing on said tape and switching from said message transmitting to said message-receiving and recording means; tape reading means in contact with said tape means for reading information recorded on said tape means; and speaker means for converting the information read by said tape reading means into audible sounds.

5. The telephone-answering device as defined in claim 1 wherein said message-receiving and recording means comprises a magnetic tape means upon which a message is recordable; tape-recording head means associated with said tape means for recording on said tape means a message; and microphone means connected to said recording head means for converting audible sounds into electrical signals recordable on said tape means.

6. The telephone-answering device as defined in claim 1 including playback means for playing back the message recorded by said message-receiving and recording means.

7. The telephone-answering device as defined in claim 1 including controlling switching means actuated by said armature means for controlling the operational state of said device.

8. The telephone-answering device as defined in claim 1 including motor means for drivingly operating said message transmitting means and said message-receiving and recording means; capstan drive means connected to said motor means, said message transmitting means and receiving and recording means having magnetic tape driven by said capstan, and flywheel means driven by said motor means for providing substantial constant rotational speed.

9. The telephone-answering device as defined in claim 1 including motor means for drivingly operating said message-transmitting means and said message-receiving and recording means.

10. The telephone-answering device as defined in claim 9 including flywheel means in contact with said motor means and providing substantially constant rotational speed for operating said message-transmitting means and said message-receiving and recording means.

11. The telephone answering device as defined in claim 1 wherein said message-transmitting means comprises magnetic tape means with a message prerecorded thereon, said message-transmitting means and said message-receiving and recording means having solid state circuitry, and first and second switching contact segments on said tape for switching said solid state relay circuitry, said switching contact segments determining the timing of said cycle through spacing on said tape of said first contact segment and switching said solid state relay circuitry from said message transmitting to said message receiving and recording means, the spacing of said second switching contact segment on said type determining the switching of said solid state relay circuitry to terminate a cycle and prepare for the next cycle; tape reading means in contact with said tape means for reading information recorded on said tape means; and speaker means for converting the information read by said tape reading means into audible sounds.

12. The telephone-answering device as defined in claim 11 wherein said message receiving and recording means comprises separate endless magnetic tape means upon which a message is recordable; capstan driving means for driving said separate endless tape and said first-mentioned tape; tape-recording head means associated with said separate endless tape means for recording on said tape means a message; and microphone means connected to said recording head means for converting audible sounds into electrical signals recordable on said separate endless tape means.